United States Patent

[11] 3,566,181

[72] Inventor Raymond C. Figlewicz
Park Ridge, Ill.
[21] Appl. No. 833,421
[22] Filed June 16, 1969
[45] Patented Feb. 23, 1971
[73] Assignee Zenith Radio Corporation
Chicago, Ill.

[54] PIN-CUSHION CORRECTION CIRCUIT
8 Claims, 7 Drawing Figs.

[52] U.S. Cl. .......... 315/24, 315/27
[51] Int. Cl. .......... H01j 29/72
[50] Field of Search .......... 315/24, 27, 27 (SR)

[56] References Cited
UNITED STATES PATENTS

| | | | |
|---|---|---|---|
| 2,906,919 | 9/1959 | Thor | 315/24 |
| 3,346,765 | 10/1967 | Barkow | 315/27 |

*Primary Examiner*—Rodney D. Bennett, Jr.
*Assistant Examiner*—Joseph G. Baxter
*Attorneys*—Francis W. Crotty and Cornelius J. O'Connor

ABSTRACT: Apparatus for effecting asymmetrical top and bottom pin cushion correction in a television receiver includes a core of saturable magnetic material upon which a signal winding and a control winding are physically oriented at right angles in order to preclude inductive coupling therebetween. An auxiliary winding, formed as an extension of the control winding, is positioned upon the core adjacent the signal winding and in an inductive coupling relation thereto. The signal winding is included in the output circuit of the vertical output stage. The control winding, which is energized from the horizontal output stage, cyclically varies the saturation of the core to modulate the vertical sweep signal flowing in the signal winding. This modulated signal is modified by a horizontal frequency component inductively coupled to the signal winding by the auxiliary winding. The inductively introduced horizontal component adjusts the relative peak amplitudes of the modulated vertical sweep signal to produce an asymmetrical vertical pin cushion correction which emphasizes beam deflection at the beginning of the sweep while attenuating beam deflection at the end of the sweep.

Inventor
Raymond C. Figlewicz
By Cornelius J. O'Connor
Attorney

PIN-CUSHION CORRECTION CIRCUIT

BACKGROUND OF THE INVENTION

This invention relates in general to apparatus for correcting distortion in the scanning raster of a television receiver and in particular to a saturable reactor apparatus for correcting pin cushion distortion in color television receivers.

Basically, pin cushion distortion is attributable to the fact that the radius of curvature of the cathode-ray tube faceplate is different than the radius of the scanning beam, as measured from its center of deflection. Other factors that contribute to pin cushion distortion include the tilted electron beam gun assembly which affects the angle that the beams pass through the deflection yoke, geometry considerations of the yoke itself, and the fact that the effective origin of the blue electron beam is vertically displaced from the central axis of the tube a greater distance than the origins of the red and green electron beams. These factors collectively produce an aberration of the reproduced image which is manifested by a bowing in at the top, bottom and sides of the raster, in other words, pin cushion distortion.

In general, top and bottom pin cushion is asymmetrical, that is, there is a greater degree of distortion or bowing in at the top of the raster than at the bottom. Side pin cushion, on the other hand, is usually more symmetrical. The subject invention is addressed to correction of top and bottom pin cushion distortion but with the realization that the invention is also applicable in resolving unsymmetrical side pin cushion distortion.

In a monochrome television receiver, pin cushion distortion can be corrected by selectively positioning permanent magnets about the periphery of the cathode-ray tube envelope so that the fields of the magnets exert a compensating deflection on the beam. In a color television receiver, however, such a magnet arrangement cannot be utilized as it would adversely affect purity of the reproduced image.

One prior art approach for correcting top and bottom pin cushion in color receivers is to employ a saturable reactor device to dynamically vary the vertical sweep signal. Specifically, it is known to provide a saturable core with a first or signal winding which is connected in series with the vertical deflection winding and to control the saturation of the core by a second or control winding which is energized by the horizontal deflection system. Accordingly, as core saturation increases, the impedance presented by the signal winding to the vertical sweep current is reduced and a resultant sweep current is derived which comprises a symmetrical modulation envelope that peaks at the start and finish of each sweep cycle thereby compensating for top and bottom pin cushion.

A saturable reactor device of the type above referred to is described in U.S. Pat. No. 3,390,364 which issued to Martyn Russell on Jun. 25, 1968. Russell observes that, in order to avoid undesired induction coupling between control and signal windings wound upon a common core, prior art saturable reactor arrangements include pairs of carefully balanced coils. With a view to avoiding this undesired transformer coupling, by less costly means, Russell discloses a toroidal core of saturable material upon which he winds the signal winding and the control winding at right angles to each other. Accordingly, by physically orienting the two windings at 90° he substantially eliminates transformer action.

There are, however, instances in which it is desired to secure a greater degree of pin cushion correction in one direction than in the other. For example top pin cushion is usually more pronounced than bottom pin cushion and this is due to a combination of factors, including the beam convergence apparatus, as previously mentioned. Moreover, top pin cushion appears to be more pronounced by virtue of the fact that the viewer's eye level is generally above the center of the picture tube so that he gazes downward toward the reproduced image. The effect upon the viewer is to create the allusion that top pin cushion has an even greater arc while pin cushion at the bottom of the raster is diminished. It is therefore desirable that pin cushion correction apparatus be capable of effecting an asymmetrical correction of raster distortion. To secure an asymmetrical correction waveform for the above purpose the prior art resorts to multileg core devices having special windings and biasing magnets, an obviously complex and therefore costly expedient.

OBJECTS AND SUMMARY OF THE INVENTION

It is therefore an object of the invention to provide an improved pin cushion correction apparatus for a color television receiver.

It is a specific object of the invention to provide a novel saturable reactor pin cushion correction apparatus.

It is another object of the invention to provide a saturable reactor apparatus for effecting correction of unsymmetrical pin cushion distortion.

It is also an object of the invention to provide a saturable reactor pin cushion correction apparatus which affords economies over prior art apparatus.

Apparatus for correcting pin cushion distortion in the scanning raster of a television receiver having a cathode-ray tube which includes beam forming and directing means, and further having a pair of deflection coils for deflecting the beam in mutually perpendicular directions to generate a two dimension raster, comprises a modulator which is coupled to one of the deflection coils. Means are provided for applying to the demodulator a sweep signal of predetermined frequency that varies, in one cycle, from a maximum amplitude in one polarity through a zero value of a maximum amplitude in an opposite polarity to establish beam scansion in one dimension of the raster. Means are also provided for applying a second signal of a predetermined different frequency to the modulator for modulating the sweep signal to develop a modulated signal having oppositely phased peak amplitudes at opposite ends of the sweep signal for application to the aforesaid one deflection coil. Finally, means are provided for additively superimposing a component of the second signal upon the modulated signal to adjust the relative peak amplitudes of the modulated signal in order to emphasize beam deflection in one direction of the aforesaid one raster dimension by the one deflection coil.

The features of the present invention which are believed to be novel are set forth with particularity in the appended claims. The organization and manner of operation of the invention, together with further objects and advantages thereof, may best be understood by reference to the following description taken in conjunction with the accompanying drawing, in the several FIGURES of which like reference numerals identify like elements and in which:

DESCRIPTION OF A PREFERRED EMBODIMENT

Figure 1:
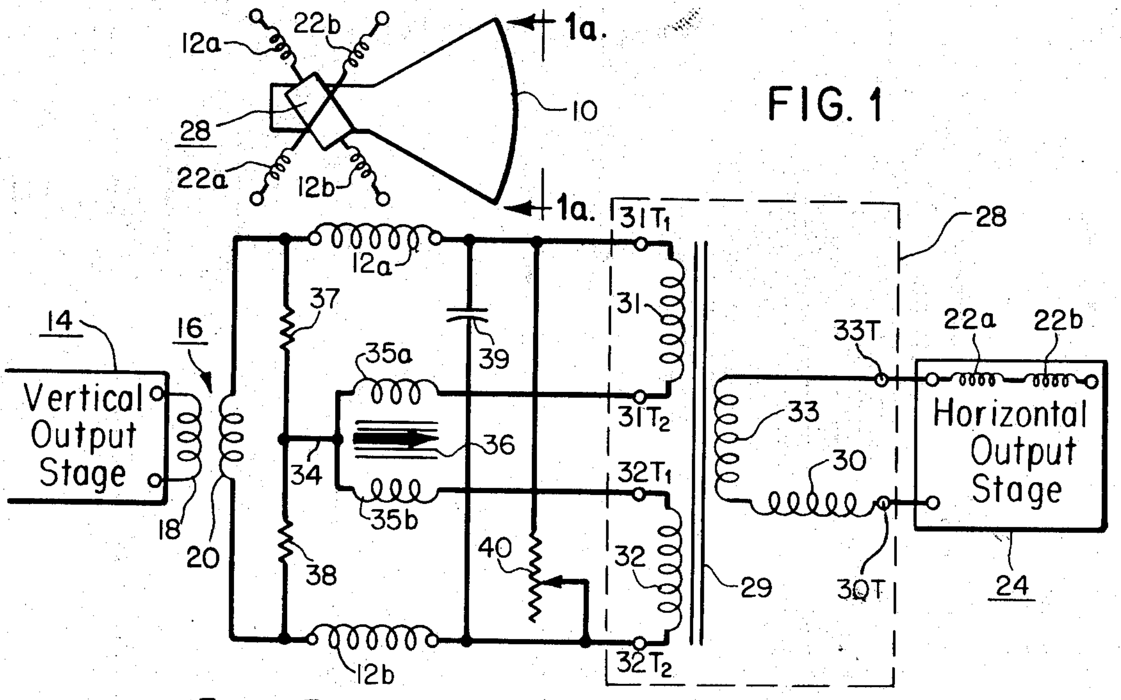
FIG. 1 is a schematic diagram of a pin cushion correction circuit for a television receiver embodying a saturable reactor apparatus constructed in accordance with the invention.

The circuit diagram of FIG. 1 schematically represents a portion of the deflection system of a color television receiver having a cathode-ray tube 10 which includes an electron gun structure for developing a plurality of electron beams. A pair of deflection coils are mounted upon the neck of tube 10 in a conventional manner for deflecting the beams in mutually perpendicular directions to generate a two dimension scanning raster. More particularly, the vertical deflection coil is conventionally formed as two substantially identical windings 12a, 12b which are coupled to a vertical output stage 14 that includes a transformer 16 having a primary winding 18 and a secondary winding 20. The horizontal deflection coil is also formed as two substantially identical windings 22a, 22b and they are included in the horizontal output stage 24.

Figure 1A:
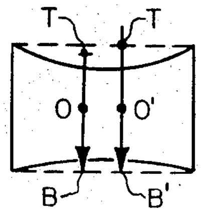
FIG. 1A is an illustration depicting top and bottom pin cushion distortion in a television scanning raster.

As is known the vertical dimension of the scanning raster displayed by cathode-ray tube 10 is established by a 60 Hz sweep signal that varies from a maximum amplitude in a negative polarity through zero to a maximum amplitude in a positive polarity. The source of this sweep signal is the vertical output stage 14. The second or horizontal dimension of the raster is generated by the 15,750 Hz sweep signal developed by horizontal output stage 24. A representation of such a raster, but exhibiting asymmetrical top and bottom pin cushion distortion, is shown in FIG. 1A.

Figures 2, 3:
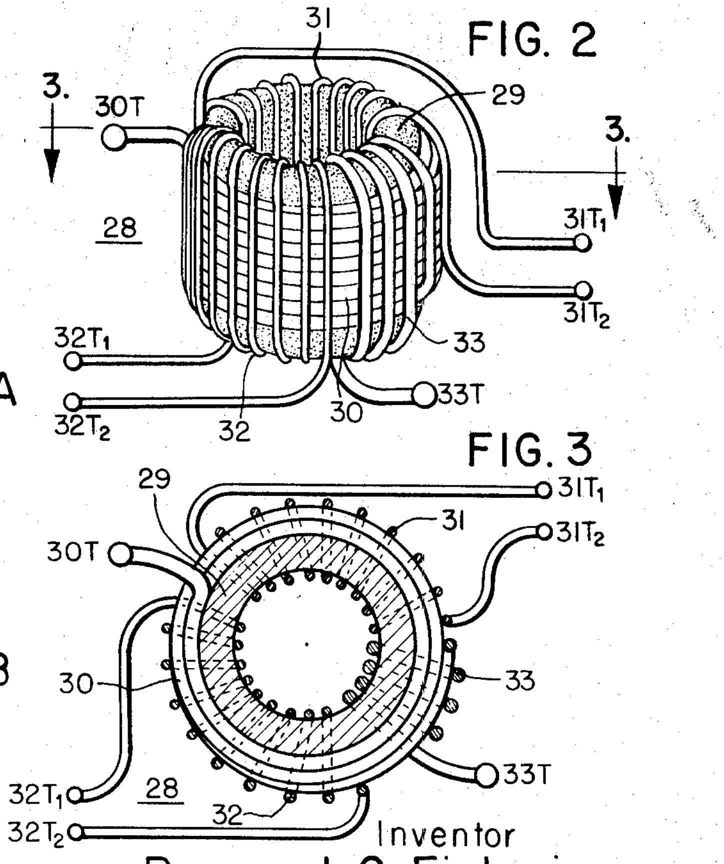
FIG. 2 is a perspective view of the saturable reactor device schematically represented in FIG. 1.
FIG. 3 is a sectional view of the FIG. 2 saturable reactor taken along lines 3—3.

In accordance with the invention, apparatus for effecting asymmetrical pin cushion correction comprises a modulator 28 for developing a modulated sweep signal having oppositely phased peak amplitudes of different magnitudes. More particularly, modulator 28 comprises a core 29 of ferrite material shaped in the form of a sleeve and having an enlarged central opening, see FIGS. 2 and 3. A control winding 30 is bobbin wound upon and circumferentially encircles the core. A pair of signal windings 31, 32, having respective terminals $31T_1$, $31T_2$ and $32T_1$, $32T_2$, enclose the core and the control winding in toroidal fashion. Wound in this manner the turns of the signal windings 31, 32 are disposed essentially parallel to the central axis of core 29 and thus oriented at right angles to the turns of control winding 30. There is, therefore, no flux coupling between the control winding and the signal windings. It is the function of winding 30 to control the saturation of core 29 and this parameter, in turn, determines the impedance that windings 31, 32 present to a signal.

Modulator 28 further comprises an auxiliary winding 33 which preferably constitutes an extension of control winding 30. Winding 33 also encloses core 29 and winding 30 in toroidal fashion and is physically positioned adjacent signal windings 31, 32 with its turns disposed essentially parallel to the turns of the signal windings so as to be in a flux coupling relation with the signal windings. Since control winding 30 and auxiliary winding 33 are preferably formed from a single conductor they require but a single pair of terminals 30T, 33T for serially connecting them across the horizontal output stage 24.

The signal windings 31, 32 are coupled across the secondary 20 of the vertical output transformer through the vertical deflection coils. More particularly, signal winding 31 is coupled through deflection coil 12a to the upper terminal of secondary 20 while signal winding 32 is coupled to the opposite terminal of the secondary through coil 12b. Terminals $31T_2$ and $32T_1$ of the signal windings are coupled to a common junction 34 through a pair of phasing coils 35a, 35b having an adjustable tuning slug 36. Connected in this way signal windings 31, 32 together with deflection coils 12a, 12b and the phasing coils constitute a series circuit across secondary 20 of the vertical output transformer. A pair of series connected equal valued balancing resistors 37, 38 are also coupled across secondary 20 and have their tie point connected to junction 34. Finally, a tuning capacitor 39 and an adjustable amplitude control resistor 40 are shunted across signal windings 31, 32 and phasing coils 35a, 35b.

Since control winding 30 is coupled to the horizontal output stage, the saturation of core 29 fluctuates at 15,750 Hz and, therefore, the impedance that signal windings 31, 32 present to the vertical scanning signal will also fluctuate at 15,750 Hz. As a result a substantially sinusoidal component, having a 15,750 Hz repetition rate, will be developed in the signal windings. It is the function of capacitor 39 to tune signal windings 31, 32 to resonate this 15,750 Hz component while it is the function of coils 35a, 35b, to phase the peaks of the horizontal frequency component with the peaks of the vertical scanning signal so as to develop an adequate horizontal frequency component in the signal winding.

Figure 4A:
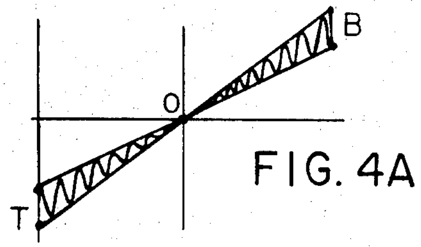
FIG. 4A illustrates a vertical deflection current waveform for effecting symmetrical correction of pin cushion distortion.

In operation, a vertical scanning signal is developed across the output of transformer 16 and applied to the series circuit formed by vertical deflection coils 12a, 12b, signal windings 31, 32 and the phasing coils. As depicted in FIG. 4A the vertical sweep signal varies from a maximum amplitude in a negative polarity through a zero value to a maximum amplitude in a positive polarity. The horizontal deflection system 24, which serves as the source of modulating signal, applies horizontal deflection energy to control winding 30 which varies the saturation of core 29 at a rate many times greater than the repetition rate of the vertical scanning signal. The saturation of the core varies from an initial value, which can be established by magnetizing the core with permanent magnets, as in the manner disclosed by Russell, to a predetermined state of saturation. The degree of saturation determines the inductance of signal windings 31, 32 and thus the reactive impedance which they present to the vertical sweep current flowing therethrough. In this fashion the horizontal sweep current amplitude modulates the vertical sweep current to develop an amplitude modulated sweep signal having oppositely polarized peak amplitudes.

In the situation herein considered, an increase in core saturation reduces the inductance of signal windings 31, 32 thus permitting the vertical sweep current to attain higher peak values. As a result the peak amplitude at each extremity of the vertical sweep is accentuated and this is shown by waveform TOB of FIG. 4A, which graphically illustrates the contribution of horizontal sweep energy to the vertical scanning signal. That this is an amplitude modulation process is evident from the fact that the amplitude increment added to portion TO of the vertical sweep current, that is, the portion that serves to deflect the electron beams from the top of the raster to the center, is the same as that added to OB, the portion that deflects the beams from the center of the raster to the bottom. Being symmetrical, sweep current TOB applies equal pin cushion correction to the top and bottom of the raster, in other words, it would eliminate an equal amount of "bowling-in" at the vertical extremities of the raster.

Figure 4B:
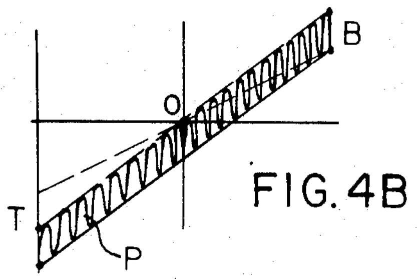
FIGS. 4B and 4C illustrate vertical deflection current waveforms for effecting asymmetrical correction of pin cushion distortion.
Figure 4C:
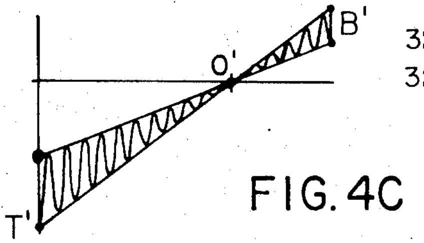

As previously noted, however, pin cushion distortion is not symmetrical, that is, top pin cushion is significantly more pronounced than bottom pin cushion, see FIG. 1A. In accordance with the invention, therefore, the disclosed demodulator serves to modify the modulated sweep current by emphasizing the correction applied to the beginning or start of the vertical scanning current while attenuating the correction applied at the end of the sweep. This calls for a correction signal which is asymmetrical, relative to its zero or crossover axis. Looking at it from another standpoint an asymmetrical sweep signal is obtained, effectively, by shifting the zero crossover of waveform TOB to the right. Specifically, an asymmetrical waveform is achieved by auxiliary winding 33 which is arranged to inductively couple negatively polarized components or sawtooth pulses P from the horizontal output stage into signal windings 31, 32. Since this is a transformer action the energy transferred from winding 33 is algebraically added or superimposed upon the modulated sweep signal TOB in the manner shown in FIG. 4B. The effect of this addition, as shown by FIG. 4C, is to develop a modified sweep signal T'O'B'in which the peak amplitude of section T'O' is amplified while the peak amplitude of part O'B' is attenuated. As a result, the amount of pin cushion correction applied to the top of the raster is greater than that applied to the bottom thereby producing asymmetrical pin cushion correction.

The described pin cushion correction apparatus has been successfully operated in a 22 inch color television receiver. The core 29 of the modulator comprised a ferrite sleeve having a length of one-half inch, an outside diameter of one-half inch and an inside diameter of .390 inch. The control winding 30 consisted of approximately 140 turns of 25 gauge copper wire while each of signals windings 31, 32 consisted of approximately 38 turns of 28 gauge copper wire. Auxiliary winding 33 was formed of 4 turns of 25 gauge wire actually an extension of control winding 30. Tuning capacitor 39 comprised a .25$\mu$f unit while a 10k ohm adjustable resistor was utilized for amplitude control 40.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Apparatus for correcting pin cushion distortion in the scanning raster of a television receiver having a cathode-ray tube which includes beam forming and directing means and having a pair of deflection coils for deflecting the beam in mutually perpendicular directions to generate a two dimension raster, said apparatus comprising:
   a core of saturable magnetic material;
   a signal winding wound upon said core in a predetermined orientation relative to an axis of said core;
   means for coupling said signal winding to one of said deflection coils;
   means for applying to said signal winding and to said one deflection coil a first sweep current varying, in one cycle, from a maximum amplitude in one polarity through a zero value to a maximum amplitude in an opposite polarity to establish beam scansion in one dimension of said raster;
   a control winding wound upon said core in a predetermined different orientation relative to the axis of said core;
   means for applying a second sweep current to said control winding for varying the saturation of said core and, thereby, the impedance of said signal winding to said first sweep current, so that said first sweep current is modulated by said second sweep current to develop a modulated sweep signal having oppositely polarized peak amplitudes for applying pin cushion correction to said one deflection coil; and
   means for modifying said modulated sweep signal comprising an auxiliary winding connected to said control winding and positioned upon said core in the same orientation as said signal winding and in an inductive coupling relation to said signal winding, for introducing a component of said second sweep current into said signal winding to adjust the relative peak amplitudes of said modulated sweep signal to emphasize beam deflection in one direction of said one raster dimension by said one deflection coil.

2. Apparatus as set forth in claim 1 in which said auxiliary winding constitutes an extension of said control winding.

3. Apparatus as set forth in claim 1 in which said core of magnetic material is formed as a hollow sleeve;
   said signal winding toroidally encloses said sleeve with its turns disposed essentially parallel to the central axis of said core;
   said control winding turns are oriented substantially normal to the turns of said signal winding; and
   said auxiliary winding turns are wound essentially parallel to the turns of said signal winding.

4. Apparatus as set forth in claim 1 in which said means for varying the saturation of said core amplitude modulates said first sweep current to develop said modulated sweep signal and said modifying means amplifies one amplitude of said modulated signal and attenuates the oppositely polarized amplitude of said modulated signal.

5. Apparatus as set forth in claim 1 in which said pair of deflection coils comprise the vertical and horizontal deflection coils of said receiver;
   said signal winding comprises a pair of coils connected in series with said vertical deflection coil; and
   said control winding and said auxiliary winding are coupled to said horizontal deflection coil.

6. Apparatus as set forth in claim 5 further comprising means for tuning said signal winding to resonate at the frequency of the horizontal deflection system system.

7. Apparatus as set forth in claim 4 in which said first sweep current varies from a maximum amplitude in a negative polarity to a maximum amplitude in a positive polarity to establish beam scansion in the vertical dimension of said raster;
   said modulated sweep signal varies from a maximum amplitude in a negative polarity to a maximum amplitude in a positive polarity; and
   said modifying means amplifies said negatively polarized amplitude of said modulated sweep signal and attenuates said positively polarized amplitude of said modulated sweep signal.

8. Apparatus for correcting distortion in the scanning raster of a television receiver having a cathode-ray tube which includes beam forming and directing means and having a pair of deflection coils for deflecting the beam in mutually perpendicular directions to generate a two dimension raster, said apparatus comprising:
   a modulator coupled to one of said deflection coils;
   means for applying to said modulator a sweep signal of predetermined frequency and varying, in one cycle, from a maximum amplitude in one polarity through a zero value to a maximum amplitude in an opposite polarity to establish beam scansion in one dimension of said raster;
   means for applying a second signal of predetermined different frequency to said modulator for modulating said sweep signal to develop a modulated sweep signal for application to said one deflection coil,
   said modulated signal having oppositely phased peak amplitudes at opposite ends of the sweep cycle;
   and means for additively superimposing a component of said second signal upon said modulated sweep signal to amplify the peak amplitude of said modulated sweep signal at one end of the sweep cycle while attenuating the peak amplitude of said modulated sweep signal at the opposite end of the sweep cycle to emphasize beam deflection in one direction of said one raster dimension by said one deflection coil.